(12) United States Patent
Kim (10) Patent No.: US 11,544,195 B2
(45) Date of Patent: Jan. 3, 2023

(54) ELECTRONIC APPARATUS AND INFORMATION PROVIDING METHOD USING THE SAME

(71) Applicant: Coupang Corp., Seoul (KR)

(72) Inventor: Seok Hyun Kim, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/448,504

(22) Filed: Sep. 22, 2021

(65) Prior Publication Data

US 2022/0091985 A1    Mar. 24, 2022

Related U.S. Application Data

(63) Continuation of application No. 17/136,555, filed on Dec. 29, 2020, now Pat. No. 11,182,297.

(30) Foreign Application Priority Data

Sep. 22, 2020 (KR) .................. 10-2020-0122601

(51) Int. Cl.
*G06F 12/08* (2016.01)
*G06F 12/0868* (2016.01)
*G06F 12/0804* (2016.01)
*G06F 12/0891* (2016.01)
*G06F 12/0897* (2016.01)

(52) U.S. Cl.
CPC ...... *G06F 12/0868* (2013.01); *G06F 12/0804* (2013.01); *G06F 12/0891* (2013.01); *G06F 12/0897* (2013.01)

(58) Field of Classification Search
CPC ................................................ G06F 12/0868

USPC .......................................................... 711/113
See application file for complete search history.

(56) References Cited

U.S. PATENT DOCUMENTS

| | | | |
|---|---|---|---|
| 8,880,807 B2 | 11/2014 | Hooker et al. | |
| 9,300,716 B2 | 3/2016 | Tune | |
| 10,044,729 B1 | 8/2018 | Astakhova et al. | |
| 10,268,599 B2 | 4/2019 | Hyde, II et al. | |
| 2002/0065992 A1* | 5/2002 | Chauvel | G06F 12/1027 712/E9.033 |
| 2005/0015758 A1 | 1/2005 | North | |
| 2007/0124309 A1 | 5/2007 | Takase et al. | |
| 2008/0133180 A1 | 6/2008 | Floyd et al. | |

(Continued)

FOREIGN PATENT DOCUMENTS

| | | |
|---|---|---|
| CN | 102929983 A | 2/2013 |
| CN | 103955357 A | 7/2014 |

(Continued)

OTHER PUBLICATIONS

International Search Report for PCT/KR2020/013470 dated Jun. 16, 2021.

*Primary Examiner* — Jae U Yu
(74) *Attorney, Agent, or Firm* — Knobbe, Martens, Olson & Bear, LLP (57) ABSTRACT

An information providing method of an electronic apparatus is disclosed. The information providing method may include receiving a counter information request, identifying cache counter information corresponding to the counter information request from a cache database related to a counter, and transmitting response information corresponding to the counter information request based on the identified cache counter information.

15 Claims, 4 Drawing Sheets

(56) References Cited

U.S. PATENT DOCUMENTS

| | | |
|---|---|---|
| 2008/0137130 A1 | 6/2008 | Ferlitsch |
| 2011/0078054 A1 | 3/2011 | Saito et al. |
| 2013/0326150 A1 | 12/2013 | Phelan et al. |
| 2014/0181827 A1 | 6/2014 | Dice et al. |
| 2014/0201458 A1 | 7/2014 | Fujikami et al. |
| 2015/0134910 A1 | 5/2015 | Lee |
| 2015/0334043 A1 | 11/2015 | Li et al. |
| 2016/0275289 A1 | 9/2016 | Sethumadhavan et al. |
| 2019/0324672 A1 | 10/2019 | Hasbun et al. |
| 2019/0324922 A1 | 10/2019 | Phelan et al. |
| 2020/0250086 A1 | 8/2020 | Khan et al. |

FOREIGN PATENT DOCUMENTS

| | | |
|---|---|---|
| CN | 105183663 A | 12/2015 |
| CN | 108134817 A | 6/2018 |
| CN | 109857764 A | 6/2019 |
| CN | 111221469 A | 6/2020 |
| JP | 2000-155509 A | 6/2000 |
| JP | 2005-157605 A | 6/2005 |
| JP | 2007-128371 A | 5/2007 |
| JP | 2008-140380 A | 6/2008 |
| JP | 2008-146631 A | 6/2008 |
| JP | 2010-026573 A | 2/2010 |
| JP | 2016-503205 A | 2/2016 |
| JP | 2018-205944 | 12/2018 |
| KR | 10-2008-0030213 | 4/2008 |
| KR | 10-2011-0005945 | 1/2011 |
| KR | 10-2016-0008509 A | 1/2016 |
| WO | WO 14/155737 | 10/2014 |

\* cited by examiner

ELECTRONIC APPARATUS AND INFORMATION PROVIDING METHOD USING THE SAME

CROSS-REFERENCE TO RELATED APPLICATIONS

This application is a continuation of U.S. patent application Ser. No. 17/136,555, filed on Dec. 29, 2020, which claims priority to Korean Application No. 10-2020-0122601, filed Sep. 22, 2020, each of which is incorporated herein by reference in its entirety.

BACKGROUND

Technical Field

The present disclosure relates to an electronic apparatus and a method of providing information using the same.

Description of the Related Art

In general, a system for providing a service to a user online may include a front end server and a back end server. The back end server may manage information to be provided to the user. The front end server may adaptively provide information received from the back end server to the user.

When the number of users using the service increases, access to a database of the front end server may increase to provide the information to the user, and an update of the database may be restricted while the information is provided. Therefore, as the number of users increases, a load of a database of the back end may increase.

Accordingly, there is a desire for technology for reducing a load of a database while effectively providing information to a user in such environment.

SUMMARY

Technical Goals

An aspect is to provide an electronic apparatus and an information providing method using the same. Specifically, an information providing method for reducing access to a main database and transmitting relevant information to a front end server within a relatively short time and an electronic apparatus therefor are to be provided.

Another aspect is to provide a method of providing information approximate to actual information stored in a database to a user while reducing a load of the database and providing desired information to the user using different schemes for updating information of or regarding a separate database for providing information based on a change in the actual information stored in the database, and an electronic apparatus therefor.

Technical goals to be achieved through the example embodiments are not limited to the technical goals as described above, and other technical tasks can be inferred from the following example embodiments.

Technical Solutions

According to a first embodiment, there is provided an information providing method of an electronic apparatus, the method including receiving a counter information request, identifying cache counter information corresponding to the counter information request from a cache database related to a counter, and transmitting response information corresponding to the counter information request based on the identified cache counter information.

According to the embodiment, the information providing method may further include receiving a counter update request, updating counter information corresponding to the counter update request in a main database related to the counter in response to the counter update request, and updating the cache counter information based on counter information stored in the main database.

According to the embodiment, the updating of the cache counter information may include updating the cache counter information based on an update time corresponding to the cache counter information.

According to the embodiment, the information providing method may include identifying at least one of information corresponding to the cache counter information from the main database, where the information includes a counter value, a change speed of the counter value, and a residual value of the counter value.

According to the embodiment, the information providing method may include transmitting, when the residual value of the counter value is less than or equal to a threshold, the response information corresponding to the counter information request based on the counter information identified from the main database.

According to the embodiment, the updating of the cache counter information may include updating the cache counter information based on a first time and then updating the cache counter information based on a second time. An interval between the first time and the second time may be determined based on at least one of information identified from the main database at the first time, where the information corresponds to the cache counter information and includes a counter value, a change speed of the counter value, and a residual value of the counter value.

According to the embodiment, when the change speed of the counter value corresponds to a predetermined speed or more, the interval between the first time and the second time may be reduced than before.

According to the embodiment, when a ratio between the change speed of the counter value and a predetermined speed corresponds to a predetermined ratio or more, the interval between the first time and the second time may be reduced than before.

According to the embodiment, when the residual value of the counter value identified during the first time corresponds to a threshold or less, the interval between the first time and the second time may be reduced than before.

According to the embodiment, the update time may be determined based on a change speed of the counter value.

According to the embodiment, the update time may be determined based on a comparison between the residual value of the counter value and a threshold.

According to a second embodiment, there is also provided an electronic apparatus including a communication device configured to receive a counter information request and transmit response information corresponding to the counter information request, a first database, a second database, and a controller configured to identify cache counter information corresponding to the counter information request from the first database related to a counter to identify the response information corresponding to the counter information request.

According to a third embodiment, there is also provided a non-transitory computer readable recording medium including a computer program for performing the above-described method.

Details of example embodiments are included in the detailed description and drawings.

Effects

According to example embodiments, one or more of the following effects are expected.

According to example embodiments, it is possible to reduce access to a main database and relatively reduce a latency by transmitting response information to a front end server based on cache counter information identified using a cache database in response to a counter information request from the front end server. Unlike the main database, when matching a specific condition, an update time interval of the cache database may be reduced, so that cache counter information stored in the cache database may be more frequently updated. Accordingly, by providing an approximate value using the cache database capable of processing a larger quantity of information at a higher speed in comparison to the main database, it is possible to reduce the access to the main database and relatively quickly process requests.

Effects are not limited to the aforementioned effects, and other effects not mentioned will be clearly understood by those skilled in the art from the description of the claims.

DETAILED DESCRIPTION

Terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
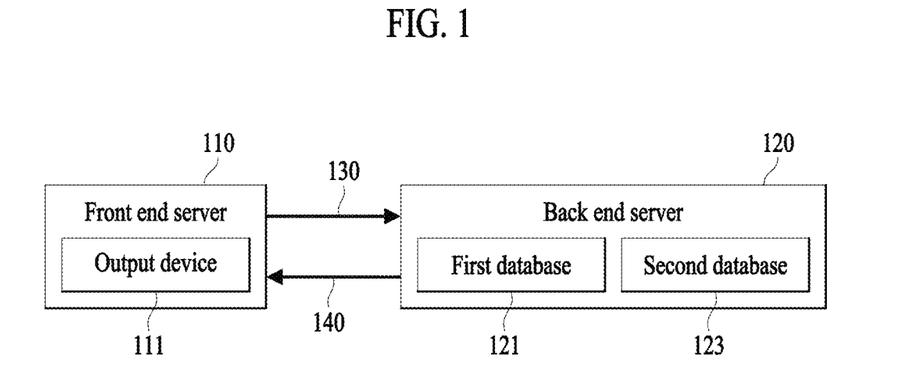
FIG. 1 is a diagram illustrating a system for providing a service according to an example embodiment.

FIG. 1 illustrates a system for providing a service according to an example embodiment.

Referring to FIG. 1, a system for providing a service may include at least one of a front end server 110 and a back end server 120. FIG. 1 illustrates only components of the system related to the present embodiment. However, it is obvious to those skilled in the art that other general-purpose components may be further included in addition to the components illustrated in FIG. 1.

The front end server 110 and the back end server 120 may communicate with one another in a network. The network may include any one or combinations of a local area network (LAN), a wide area network (WAN), a value added network (VAN), a mobile radio communication network, and a satellite communications network. Also, the network is a comprehensive data communication network that allows network components to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC), but is not limited thereto.

The front end server 110 may transmit a counter information request 130 to the back end server 120 based on at least one of a user's request and a server's request. The back end server 120 may transmit response information 140 corresponding to the counter information request 130 to the front end server 110. The front end server 110 may output the received response information 140 through an output device 111. For example, when a user requests information on or regarding a specific page from the front end server 110, the front end server 110 may transmit a request for information associated with the corresponding page to the back end server 120. In response to the request, the back end server 120 may transmit a value stored in at least one database among a plurality of databases to the front end server 110.

The back end server 120 may include at least one of a first database 121 and a second database 123. Here, the first database 121 may be a database in which cached information corresponding to the requested information is stored. The second database 123 may be a database in which a value corresponding to actual information is stored. The information stored in the first database 121 may be updated based on the second database 123 at preset time intervals. In an example, in terms of information frequently accessed by the user, the back end server 120 may provide information to the front end server 110 based on the value stored in the first database 121. In this example, when a change in specific information is to be recorded, the back end server 120 may perform an update corresponding to the change in specific information in the second database 123.

In an example, the first database 121 may be a cache database in which cache counter information is stored, and the second database 123 may be a main database in which counter information is stored. The cache database distinguished from the main database may store and load the cache counter information and may process a larger quantity of information at a higher speed when compared to the main database. A speed at the cache database accesses the cache counter information may be higher than a speed at the main database accesses the counter information. Accordingly, the cache database may process a larger amount of operations per unit time. Also, in the example embodiment, the cache database may be implemented using a local memory of a server related to the main database or a memory of another server. Although the cache database is described in contrast with the main database in the example embodiment, the two databases may also be implemented in other ways.

In this instance, the first database 121 may generate the cache counter information based on the counter information of or regarding the second database 123. Also, the first database 121 may update the cache counter information based on the counter information of the second database 123 at preset time intervals. The response information transmitted in response to the counter information request may be determined based on the cache counter information stored in the cache database. In addition, the response information may be an approximate value of the counter information stored in the main database. Specifically, when the cache counter information stored in the cache database is updated based on counter information stored in the main database at a time T1 and a time T2, and when the counter information request is received from the front end server in a period of time between the time T1 and the time T2, the back end server may transmit the response information based on the cache counter information stored in the cache database updated at the time T1. In this case, the response information may be an approximate value of the counter information stored in the main database.

The first database 121 may store the cache counter information, and the second database 123 may store the counter information. The counter information may include at least one of a counter value, a change speed of the counter value, and a residual value of the counter value. The cache counter information may include at least one of a cache counter value and a residual value of the cache counter value. The cache counter information may be determined based on the counter information.

In this instance, a counter may be numerical information monitored or managed by the back end server 120 and may be numerical information that increases or decreases. When the counter value is numerical information that increases, a residual value of the counter value may be numerical information that decreases to correspond to the counter value. When the counter value is numerical information that decreases, a residual value of the counter value may be numerical information that increases to correspond to the counter value. As an example, the back end server 120 may use the counter to perform stock management or budget management related to a specific event.

Specifically, when a quantity of a product A in stock at a time T0 is 10000, a counter value of the product A at the time T1 may be 500, a residual value of the counter value may be 9500, and a change speed of the counter value may be VA. In addition, in this case, a counter value of the product A at the time T2 may be 2000, a residual value of the counter value may be 8000, and a change speed of the counter value may be VB. Also, in this case, a counter value of the product A at a time T3 may be 7000, a residual value of the counter value may be 3000, and a change speed of the counter value may be VC. As another example, the back end server 120 may perform budget management using the counter. When a budget is 100 million won at the time T0, a counter value at the time T1 may be 10 million won, a residual value of the counter value may be 90 million won, and a change speed of the counter value may be V1. In addition, in this case, a counter value at the time T2 may be 30 million won, a residual value of the counter value may be 70 million won, and a change speed of the counter value may be V2. Also, in this case, a counter value at the time T3 may be 60 million won, a residual value of the counter value may be 40 million won, and a change speed of the counter value may be V3. The usage of the counter is not limited to the stock management and budget management, and may also be applied in a case in which management of numerical information is performed.

The back end server 120 may use the counter to monitor or manage the numerical information. The front end server 110 may display information received from the back end server 120. The back end server 120 may transmit response information to the front end server 110 based on information acquired through the first database 121. The first database 121 may update the stored cache counter information based on the counter information stored in the second database 123.

In this instance, the second database 123 which is the main database may update relevant information for each time the counter information is changed. Alternatively, the second database 123 which is the main database may update relevant information in real time. For example, when the counter information is changed in the stock management, the second database 123 may update relevant information.

In addition, the first database 121 which is the cache database may perform an update based on information acquired from the second database 123. When access to the second database 123 frequently occurs for the update of the first database 121, a latency and a throughput may increase. In a case of the stock management or budget management under a certain condition, it is sufficient that information output to a user is not an actual value but an approximate value of the actual value. Thus, frequent access to the second database 123 may not be required for the update of the first database 121, which may reduce the latency and throughput. However, when the counter information approaches a threshold at a time of using the cache counter information, and when information displayed to the user is different from actual information, the information displayed to the user may be different from information that the user can respond to. In this case, counter information corresponding to the actual value may be output. The user and the front end server may request the counter information in the same manner. The back end server may determine a database including information to be returned based on a changed state or current state of the counter information. In addition, the back end server may adjust a period of updating the cache database based on information on or regarding the aforementioned states.

Hereinafter, an operation of the back end server 120 including the first database 121 and the second database 123 will be described in detail.

Figure 2:
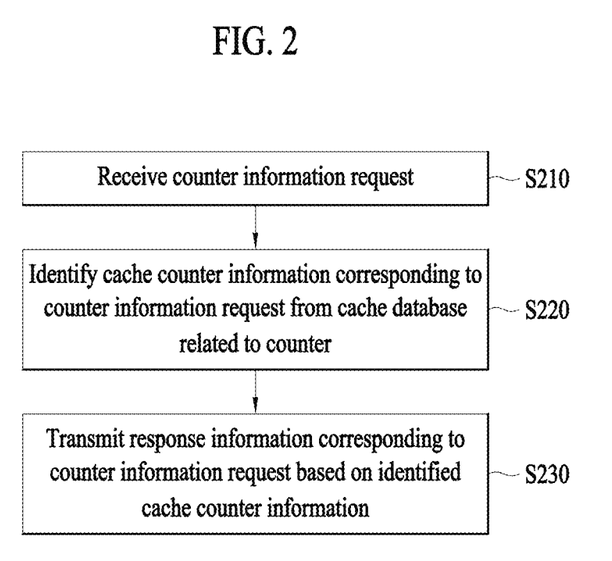
FIG. 2 illustrates an information providing method performed in an electronic apparatus according to an example embodiment.

FIG. 2 illustrates an information providing method performed in an electronic apparatus according to an example embodiment.

Referring to FIG. 2, in operation S210, an electronic apparatus may receive a counter information request. The electronic apparatus may be a device corresponding to a back end server and may receive a counter information request from a front end server. The front end server may manage a target having numerical information to be monitored based on counter information. For example, when selling a product with a limited quantity, the back end server may manage quantity information of or regarding the product, and the front end server may receive relevant information from the back end server and output the relevant information.

In operation S220, the electronic apparatus may identify cache counter information corresponding to the counter information request from a cache database related to a counter. The electronic apparatus corresponding to the back end server may include a cache database in which cache counter information is stored and a main database in which counter information is stored.

In this instance, the cache counter information may be updated based on the counter information stored in the main database. Specifically, the main database may update relevant information in real time or for each time the counter information is changed. Unlike the main database, the cache database may update the cache counter information based on the counter information stored in the main database. More specifically, the electronic apparatus may receive a counter update request. In response to the counter update request, the electronic apparatus may update counter information stored in a main database related to a counter. The counter update request may be a request received in real time or for each time the counter information is changed.

In addition, the electronic apparatus may update the cache counter information based on the counter information stored in the main database. The cache counter information may include at least one of a cache counter value and a residual value of the cache counter value. Here, the cache counter value may correspond to the counter value of the main database. Also, the residual value of the cache counter value may correspond to the residual value of the main database. Unlike the counter information, the electronic apparatus may update the cache counter information based on an update time corresponding to the cache counter information. In other words, the cache counter information stored in the cache database may be determined at an instance of updating based on the counter information stored in the main database. For example, when selling a product with a quantity limited by 10000, if a counter value stored in the main database at a time T1 is 1000 and a counter residual value is 9000, a cache counter value stored in a cache database updated at the time T1 may be 1000 and a residual value of the cache counter value may be 9000. In this example, if a counter value stored in the main database at a time T2 is 1020 and a counter residual value is 8980, a cache counter value stored in a cache database updated at the time T2 may be 1020 and a residual value of the cache counter value may be 8980.

Here, the update time of the cache database may be changed based on the counter information. Specifically, the cache database may update the cache counter information based on a first time, and then update the cache counter information based on a second time. An interval between the first time and the second time may be determined based on at least one of information identified from the main database at the first time. Here, the identified information may correspond to cache counter information and may include a counter value, a change speed of the counter value, and a residual value of the counter value. More specifically, the cache database may update the cache counter information at the time T1, update the cache counter information at the time T2, and then update the cache counter value at a time T3. In this instance, an interval between T2 and T1 may be determined based on the counter information identified from the main database at the time T1. Also, an interval between T3 and T2 may be determined based on the counter information identified from the main database at the time T2.

According to the example embodiment, when a change speed of a counter value identified from the main database at a current time corresponds to a predetermined speed or more, a time interval at which the update is performed may be reduced. In this case, the change speed of the counter value may be determined using a counter value corresponding to a previous time (e.g., T0) and a counter value corresponding to the current time (e.g., T1). The predetermined speed may be determined based on statistics in advance. Specifically, when a change speed of the counter value identified from the main database at T1 is less than the predetermined speed and a change speed of the counter value identified from the main database at T2 is greater than or equal to the predetermined speed, a time interval between T3 and T2 may be reduced to be less than a time interval between T2 and T1. This is for more frequently monitoring the counter value when it is determined that the change speed of the counter value is relatively high.

According to the example embodiment, when a ratio between the change speed of the counter value identified from the main database at the current time and the predetermined speed corresponds to a specific ratio or more, a time interval at which the update is performed may be reduced. In this case, the change speed of the counter value may be determined based on a counter value corresponding to a previous time (e.g. T0) and a counter value corresponding to the current time (e.g. T1). The predetermined speed and the specific ratio may be determined based on statistics in advance. Specifically, when a ratio between a change speed of the counter value identified from the main database at T1 and the predetermined speed is less than the specific ratio, and when a ratio between a change speed of the counter value identified from the main database at T2 and the predetermined speed is greater than or equal to the specific ratio, a time interval between T3 and T2 may be reduced to be less than a time interval between T2 and T1. This is for more frequently monitoring the counter value when it is determined that the change speed of the counter value is relatively high.

According to the example embodiment, when a residual value of the counter value identified from the main database at the current time corresponds to a threshold or less, a time interval at which the update is performed may be reduced. In this case, the threshold may be determined based on statistics in advance. For example, when the threshold is set to 500 in advance, and when a residual value of the counter value identified from the main database at T1 is 530, a time interval between T2 and T1 may remain as before. In this case, however, if a residual value of the counter value identified from the main database at T2 is 495, a time interval between T3 and T2 may be reduced to be less than the time interval between T2 and T1. This is for more frequently monitoring the counter information. More specifically, the threshold may be subdivided into a plurality of thresholds such as a threshold 1 (e.g., 500), a threshold 2 (e.g., 300), and a threshold 3 (e.g., 100). In this case, when residual values of counter values correspond to respective thresholds or less, a time interval at which the update is performed may be reduced. For example, when the residual value of the counter value is 530 at T1 and the residual value of the counter value is 495 at T2, the time interval between T2 and T1 may remain as before while the time interval between T3 and T2 is reduced to be less than the time interval between T2 and T1. In this example, when the residual value of the counter value corresponds to a value between the threshold 1 and the threshold 2, the time interval between T3 and T2 may be maintained. When the residual value of the counter value corresponds to a value less than or equal to the threshold 2, the time interval may be reduced than before. In a case in which the residual value of the counter value is 317 at T11, the residual value of the counter value is 303 at T12, and the residual value of the counter value is 294 at T13, a time interval between T11 and T12 and a time interval between T13 and T12 may correspond to the time interval between T3 and T2. However, a time interval between T13 and T14 may be reduced to be less than the time interval between T13 and T12. This is for more frequently monitoring as the residual value of the counter value approaches "0." When the residual value of the counter value corresponds to a value less than or equal to the threshold 3, the time interval may be further reduced than before. In a case in which the residual value of the counter value is 111 at T25, the residual value of the counter value is 102 at T26, and the residual value of the counter value is 98 at T27, a time interval between T25 and T26 and a time interval between T27 and T26 may correspond to the time interval between T13 and T14. However, a time interval between T27 and T28 may be reduced to be less than the time interval between T27 and T26. When the residual value of the counter value corresponds to a value less than or equal to the threshold 3, the cache database may update relevant information almost in real time. Accordingly, the cache database may update the relevant information almost in real time by referencing the counter information stored in the main database. Alternatively, when the residual value of the counter value corresponds to a value less than or equal to the threshold 3, the electronic apparatus may determine response information based on the counter information identified in the main database. That is, the response information may be determined based on information identified in the main database instead of information identified in the cache database. This is because when the residual value of the counter value corresponds to a value less than or equal to the threshold 3, the residual value reaches almost "0" and more frequent monitoring is performed.

In addition, according to the example embodiment, the cache database may update the cache counter information in consideration of the counter value, the change speed of the counter value, and the residual value of the counter value.

In operation S230, the electronic apparatus may transmit response information corresponding to the counter information request based on the identified cache counter information. Specifically, when the cache database updates the cache counter information based on the counter information, the electronic apparatus may identify the cache counter information. In this case, the electronic apparatus may transmit the response information corresponding to the counter information request received from the front end server to the front end server. Here, the response information may be determined based on the identified cache counter information. For example, when selling a product with a quantity limited by 10000, the electronic apparatus may determine response information based on 8240 corresponding to the cache counter value and 1760 corresponding to the residual value of the cache counter value at the time T1 and transmit the determined response information to the front end server. As such, the electronic apparatus may determine the response information by accessing the cache database instead of accessing the main database in response to the counter information request and transmit the response information to the front end server, which may reduce a latency and a load of the main database.

Figure 3:
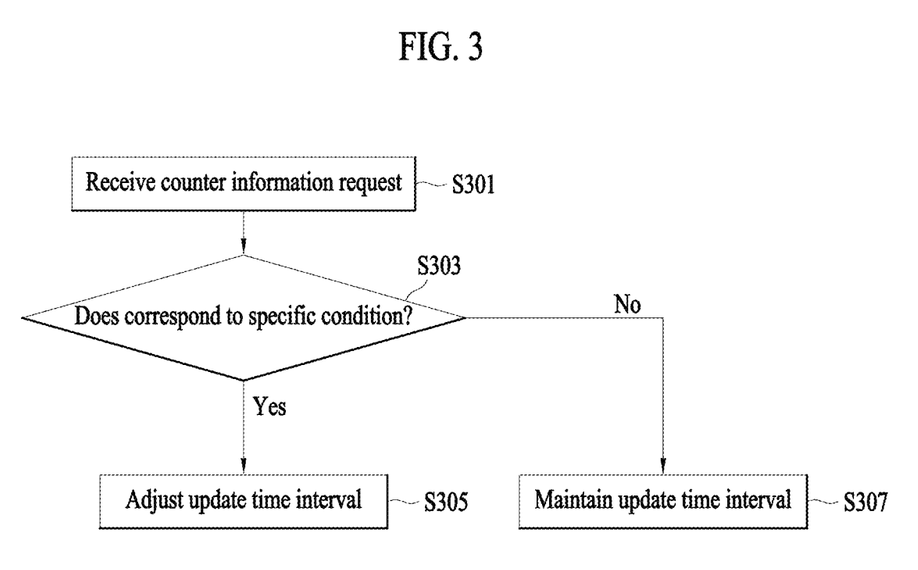
FIG. 3 illustrates a process of determining an update time corresponding to cache counter information according to an example embodiment.

FIG. 3 illustrates a process of determining an update time corresponding to cache counter information according to an example embodiment.

Referring to FIG. 3, in operation S301, an electronic apparatus may receive a counter information request from a front end server. A counter may be numerical information monitored by the electronic apparatus and may be numerical information that increases or decreases. The electronic apparatus may manage the numerical information, and the front end server may receive relevant information from the electronic apparatus. A main database in which counter information is stored may update relevant information for each time the counter information is change or update relevant information in real time. A cache counter database in which cache counter information is stored may update the cache counter information based on an update time. The cache counter information stored in the cache database may be determined based on the counter information stored in the main database at an instance of updating. When updating the cache counter information at a time T1, the cache counter information may be updated based on the counter information stored in the main database. In this instance, the electronic apparatus may determine response information based on the cache counter information and transmit the determined response information to the front end server. An update time of the cache counter information may be an unfixed value and determined in consideration of a specific condition. For example, the update time may be determined based on a change speed of a counter value or determined based on a comparison between a residual value of the counter value and a threshold.

In operation S303, the electronic apparatus may verify whether to correspond to a specific condition. Specifically, the electronic apparatus may monitor relevant information at an instance that the cache database is updated and verify whether the relevant information corresponds to the specific condition. In operation S305, in a case of corresponding to the specific condition, the electronic apparatus may adjust an update time interval. In operation S307, in a case of not corresponding to the specific condition, the electronic apparatus may maintain the update time interval. As an example, when the change speed of the counter value is less than a predetermined speed, accuracies of the counter value and the cache counter value may be maintained at a predetermined level and thus, the update time interval of the cache counter information may be maintained. When the change speed of the counter value is greater than or equal to the predetermined speed, the update time interval of the cache counter information may be reduced to maintain the accuracies of the counter value and the cache counter value at the predetermined level. That is, by more frequently updating the cache counter information, an accuracy between the counter information and the cache counter information may be maintained at the predetermined level. As another example, when the residual value of the counter value is greater than or equal to a threshold, a probability that the residual value of the counter value reaches "0" within a predetermined period of time may be relatively low and thus, the update time interval of the cache counter information may be maintained. When the residual value of the counter value is less than the threshold, the probability that the residual value of the counter value reaches "0" within the predetermined period of time may be relatively high and thus, the update time interval of the cache counter information may be reduced. The threshold may be subdivided into a plurality of thresholds. When residual values of counter values correspond to respective thresholds, different update time intervals may be applied. In the example embodiment, a counter value of which a residual value is zero may be set to be the threshold. When the counter value reaches the threshold, information displayed to a user and an action taken based on the corresponding information may be changed and thus, a counter value corresponding to an actual counter value may be displayed to the user. In this case, a time interval at which the cache database is updated may be adjusted based on a degree to which the counter value reaches the threshold. Alternatively, when the counter value approaches the threshold, information corresponding to an actual counter value may be provided to the user by returning the counter value of the main database to the front end server or the user. Although a criterion for directly returning the counter value of the main database may be performed similar to the above-described method of determining the update time interval of the cache database, a value of the criterion may be determined in consideration of a load of the main database and a user's experience.

Also, when updating the cache counter value of the cache database, if values corresponding to a plurality of counter values are updated from the main database, the load of the main database may increase due to the cache counter value update. To avoid this, a current load level of the main database may be determined. As a result, when the load level is high, an information update time of a cache counter in which a counter residual value is a predetermined value or more may be adjusted. For example, an update for one period may be omitted, and an update is performed in a next period. As such, a period for updating the cache counter value may be changed based on the load level of the main database.

Figure 4:
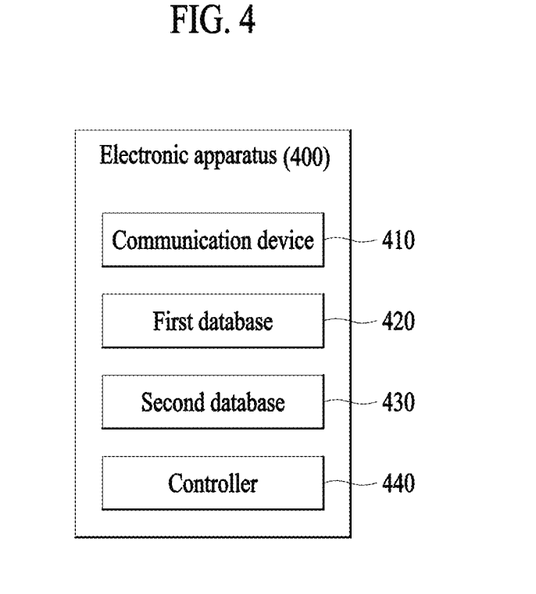
FIG. 4 is a block diagram illustrating an electronic apparatus according to an example embodiment.

FIG. 4 is a block diagram illustrating an electronic apparatus according to an example embodiment.

According to an example embodiment, an electronic apparatus 400 may include a communication device 410, a first database 420, a second database 430, and a controller 440. FIG. 4 illustrates only components of the electronic apparatus 400 related to the present embodiment. However, it is obvious to those skilled in the art that other general-purpose components may be further included in addition to the components illustrated in FIG. 4. Since the electronic apparatus 400 may include contents of the above-described electronic apparatus, redundant description will be omitted.

The communication device 410 may be a device for performing wired and/or wireless communication and may communicate with a front end server. The communication device 410 may use communication technologies such as global system for mobile communication (GSM), code division multi access (CDMA), long term evolution (LTE), 5G, wireless LAN (WLAN), Wi-Fi, Bluetooth™, radio frequency identification (RFID), IrDA communication, Zig-Bee, and NFC, for example. In the example embodiments, the communication device 410 may also be referred to as a transceiver. Through the transceiver, the electronic apparatus 400 may exchange information with an external node.

The first database 420 may correspond to a cache database in which cache counter information is stored. The second database 430 may correspond to a main database in which counter information is stored. The cache counter information may be determined based on the counter information.

The controller 440 may control an overall operation of the electronic apparatus 400 and process data and a signal. The controller 440 may include at least one hardware unit. In addition, the controller 440 may operate through one or more software modules generated by executing program codes stored in a memory. Since the controller 440 may include a processor and a memory, the processor may execute a program code stored in the memory to control an overall operation of the electronic apparatus 400 and process data and a signal. Also, in the example embodiments, the controller 440 may include at least one processor.

The controller 440 may transmit response information to a front end server using cache counter information, thereby reducing access to a database and a latency.

Meanwhile, although the description of a service providing system is given based on a front end and a back end separately, it is merely a conceptual manner. In an actual implementation, it is apparent that example embodiments of the present disclosure can be applied to a service including a server for providing information stored in a database in response to a user request.

The electronic apparatus or terminal described herein may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus for providing information from a database while reducing access to the database, the method comprising:
   updating cache counter information of a cache database based on an update time interval, the update time interval determined based on counter information of a main database;
   receiving a counter information request;
   identifying the cache counter information of the cache database in response to the counter information request; and
   transmitting response information corresponding to the counter information request based on the cache counter information,
   wherein the update time interval is determined based on at least one of a counter value identified from the main database, a change speed of the counter value, or a residual value of the counter value.

2. The method of claim 1, wherein, in response to the residual value of the counter value being less than a preset value, the update time interval is reduced.

3. The method of claim 2, wherein the transmitting of the response information comprises transmitting the response information corresponding to the counter information request based on the counter information identified from the main database in response to the residual value of the counter value being less than a threshold.

4. The method of claim 1, wherein, in response to the change speed of the counter value being greater than or equal to a preset speed, the update time interval is reduced.

5. The method of claim 4, wherein, in response to the change speed of the counter value being greater than or equal to a threshold speed, the transmitting of the response information comprises transmitting the response information corresponding to the counter information request based on the counter information identified from the main database.

6. The method of claim 1, wherein, in response to a ratio between the change speed of the counter value and a preset speed being greater than or equal to a predetermined ratio, the update time interval is reduced.

7. The method of claim 1, wherein, in response to the counter value being greater than a preset value, the update time interval is reduced.

8. The method of claim 1, wherein the counter information includes at least one of the counter value identified from the main database, the change speed of the counter value, and the residual value of the counter value.

9. The method of claim 1, wherein, in response to the residual value of the counter value being greater than or equal to a preset value, the update time interval is maintained.

10. The method of claim 1, wherein, in response to the change speed of the counter value being less than a preset speed, the update time interval is maintained.

11. The method of claim 1, wherein, in response to a ratio between the change speed of the counter value and a preset speed being less than a predetermined ratio, the update time interval is maintained.

12. The method of claim 1, wherein, in response to the counter value being less than a preset value, the update time interval is maintained.

13. The method of claim 1, wherein the updating of the cache counter information comprises:
   receiving a counter update request;
   updating the counter information of the main database in response to the counter update request; and
   updating the cache counter information of the cache database in consideration of the update time interval determined based on the counter information.

14. A non-transitory computer-readable recording medium comprising a computer program for performing the method of claim 1.

15. An electronic apparatus for providing information from a database while reducing access to the database comprising:
   a communication device configured to receive a counter information request and transmit response information corresponding to the counter information request;
   a first database configured to store cache counter information updated based on an update time interval, the update time interval determined based on counter information;
   a second database configured to store counter information; and
   a controller configured to update the cache counter information of the first database in consideration of the update time interval determined based on the counter information, identify the cache counter information from the first database in response to the counter information request, and identify response information corresponding to the counter information request based on the cache counter information,
   wherein the update time interval is determined based on at least one of a counter value identified from the main database, a change speed of the counter value, or a residual value of the counter value.

* * * * *